June 25, 1935. R. E. MATHES Re. 19,626

MULTIPLEX RECEIVING APPARATUS

Original Filed March 30, 1933 2 Sheets-Sheet 1

INVENTOR
R. E. MATHES
BY H. S. Grover
ATTORNEY

MULTIPLEX RECEIVING APPARATUS

Original Filed March 30, 1933 2 Sheets-Sheet 2

INVENTOR
R. E. MATHES
BY
ATTORNEY

Reissued June 25, 1935 Re. 19,626

UNITED STATES PATENT OFFICE 19,626

MULTIPLEX RECEIVING APPARATUS

Richard E. Mathes, Westfield, N. J., assignor to Radio Corporation of America, a corporation of Delaware Original No. 1,963,587, dated June 19, 1934, Serial No. 663,449, March 30, 1933. Application for reissue February 20, 1935, Serial No. 7,392

13 Claims. (Cl. 178—52)

This invention relates to multiplex telegraph receiving systems, and has for its principal object to provide, in such a system, a method of and apparatus for easily and efficiently assigning the received signals to the different channels.

The present invention, although not limited thereto, finds particular application to multiplex systems of the time division type, and for this reason the invention will be described with special regard thereto. In multiplex systems of the time division type the successive basic units of each channel are divided into equal portions of like number as the several channels, and the transmitting circuit is assigned consecutively to successive channels for a time interval equal at most to one of these portions, the remaining portion of each basic unit of each channel being discarded and subsequently restored at the receiving end of the circuit. Such a multiplex arrangement is described in Patent No. 1,979,484, granted November 6, 1934.

In brief, the invention comprises a coupling system for assigning the incoming signals to their respective channels, and for enabling the received signals to be rebuilt to their original form as at the transmitting station, whereby the suppressed portions of the transmitted signals are restored. For effecting this purpose, use is made of a Wheatstone bridge circuit whose normal condition of electrical stability is changed upon the flow of signal currents in the input circuit of the receiving arrangement. In practice, the bridge, in an unbalanced condition, is used to produce suitable pulses in order to affect the receiving apparatus in the various channels.

A feature of the invention is the distributor or so-called "kicker commutator" for assigning the incoming circuit to the various channels. By means of this distributor, the tolerance or variation permitted the signal is increased, and certain undesirable effects, such as fortuitous distortion, lack of perfect synchronizing phase, static and noise, are overcome, or at least greatly reduced.

Figure 1:
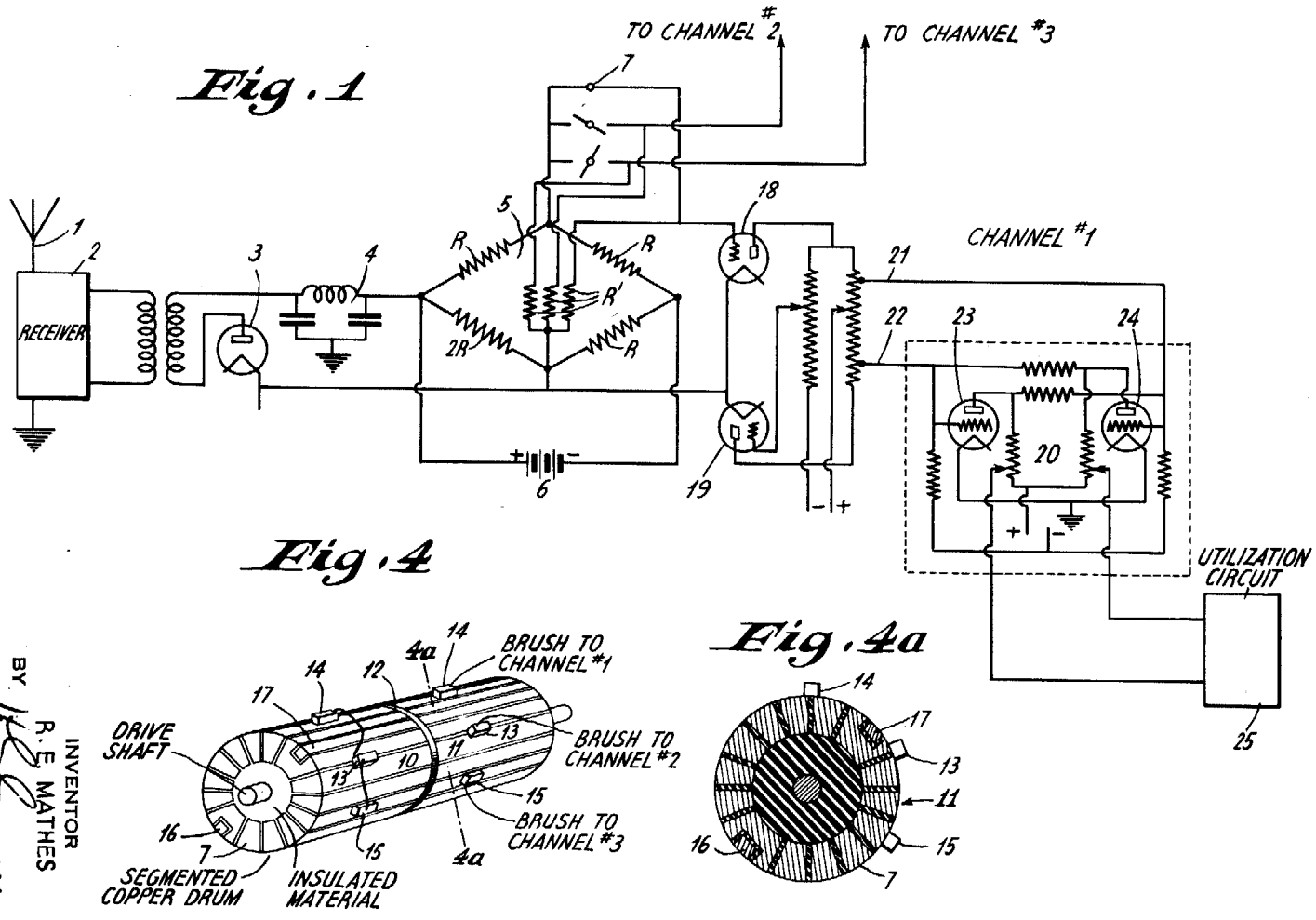
Figure 2:
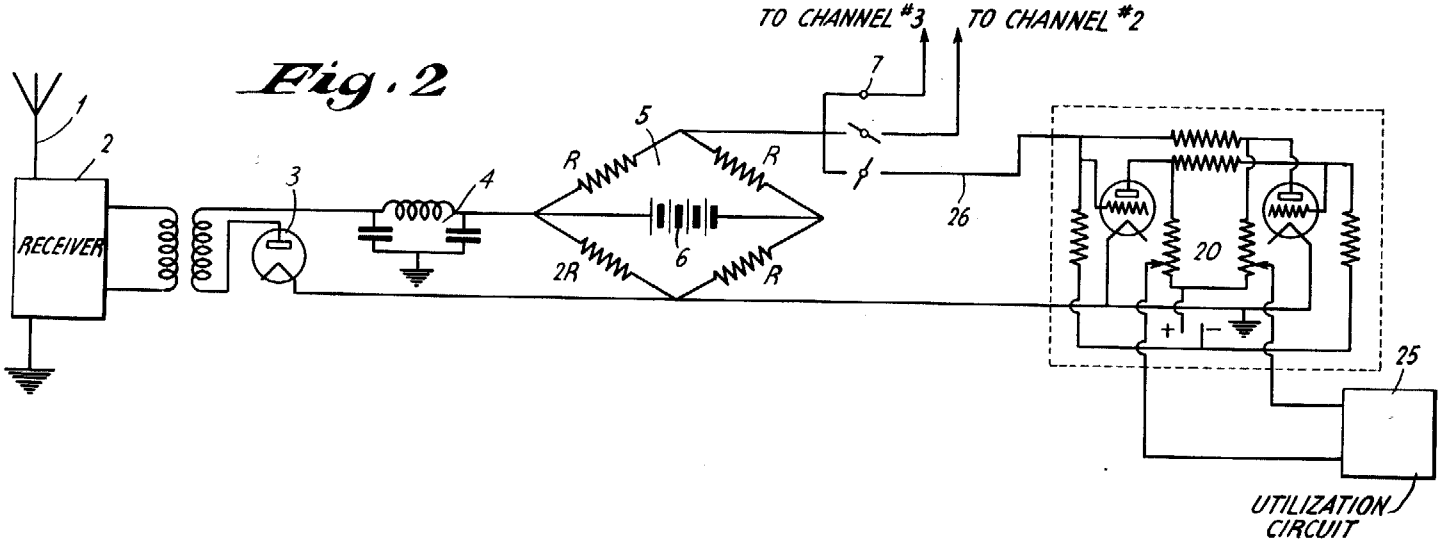
Figure 3:
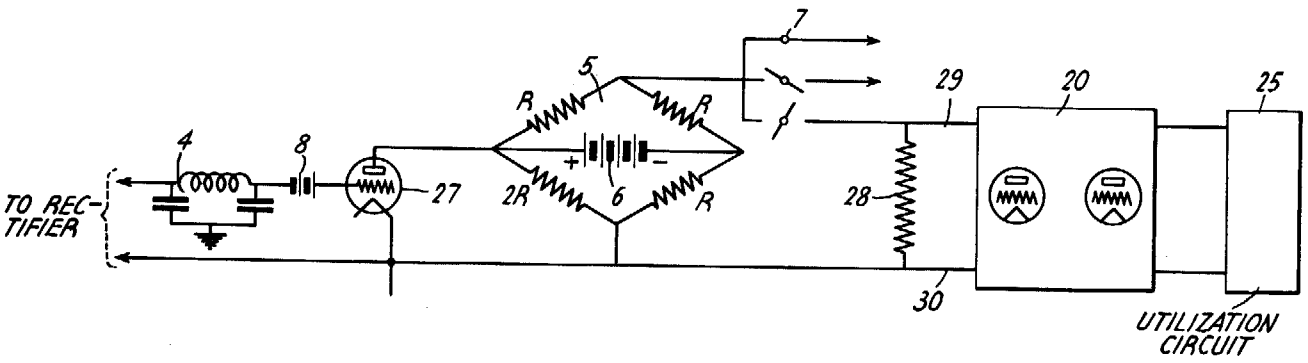

Other objects and features will appear in the subsequent detailed description taken in conjunction with the accompanying drawings, wherein Figure 1 illustrates one embodiment of a receiving circuit in accordance with the present invention, and Figures 2 and 3 illustrate modifications thereof. Figure 4 shows the novel distributor or so-called "kicker commutator" device, and Figure 4*a* shows a cross-sectional view of Fig. 4 along the line 4*a*—4*a*.

Referring to Figure 1 of the drawings in more detail, there is shown any suitable type of energy collector, such as antenna 1, for receiving the incoming signal. From the antenna the signal is passed to receiving apparatus 2 which amplifies the collected energy and applies same to rectifier 3 from which a rectified signal is supplied, through a low pass filter 4, to the Wheatstone bridge arrangement 5. The filter is shown in conventional form and consists merely of series inductance and shunt capacitance for smoothing out whatever alternating components remain in the rectified signal.

Bridge circuit 5 consists, essentially, of four arms, three of which comprise equal resistances equivalent to, let us say, a value R and the fourth arm of which comprises a different resistance, such as 2R, in order to effect an unbalanced condition. Across this latter arm, and in parallel relationship thereto, is rectifier 3. Connected to one diagonal of the bridge is a source of unidirectional potential 6 and across the other diagonal is shown a distributor or kicker device 7 which, at predetermined intervals, assigns the bridge circuit to the various channels.

The three channel distributor or kicker comprises a drum arrangement driven from a drive motor, not shown, which is synchronously controlled by the incoming signals. The arrangement of this distributor is shown in detail in Figures 4 and 4*a*, to which reference is now made. This drum may consist of any suitable dielectric material, but is preferably made of metal, such as copper, in order to insure more uniform wear of the periphery of the drum. If made of metal, the drum should be divided into halves, such as 10 and 11, which are insulated, as shown in the drawings, by suitable insulation 12, the halves, in turn, if desired, being split into segments which are insulated both from one another and from the shaft. In practice it has been found that the short segments prevent interaction between channels having brushes contacting simultaneously on the same half part of the drum. In contact with the distributor or commutator drum, and separated from each other around the periphery thereof, are pairs of brushes 13, 14, 15, etc. which connect with the circuits in the various channels. Embedded in the surface of the drum and insulated therefrom are copper bars 16 and 17 arranged to make electrical contact with and connect together the different pairs of brushes as the drum revolves. Each bar may comprise two halves arranged on a single line which are connected together or else one long bar of a length sufficient to bridge the two brushes associated with each channel. It should be understood that there are as many pairs of brushes as there are channels. Furthermore, the number of copper bars are so chosen in conjunction with the speed of rotation of the drum as to provide that one bar shall make contact with all such pairs of brushes once for each channel dot length. In the example shown, in which two bars 16 and 17 are provided, the drum will make one complete revolution for two dot lengths of channel speed. The width of the bars is preferably approximately one-tenth or even less of the circumferential distance between the brushes, this distance being arranged to conform to the dot length of the composite signal. The copper bars will thus only connect pairs of brushes together for time intervals corresponding to one-tenth the Baud dot length of the composite signal, and consequently any variation of the signal outside this one-tenth limit will have no disturbing influence on the apparatus in the various channels. It will thus be evident that the system is comparatively free from disturbances, such as are due to distortion, static, noise, etc.

A distributor arrangement of this type may be utilized for any number of channels merely by suitably placing numbers of brush sets about the circumference and assigning each set to a successive channel circuit, in a manner similar to that described above. For example, for three channels three brush sets are provided spaced sixty degrees apart about the axis of the commutator. Although this particular type of distributor is preferred for the advantages hereinabove mentioned it will be understood, of course, that any desired type of distributor arrangement may be employed.

The apparatus in each channel as shown in the embodiment of Figure 1 comprises a pair of tubes 18 and 19 in circuit with the distributor arrangement and with a locking circuit 20. Tube 18 is normally arranged to pass current and acts as a coupling tube, while tube 19 acts as a phase reversal tube to provide push-pull action on leads 21 and 22 leading to the locking circuit. The locking circuit 20 comprises two electron discharge devices 23 and 24 which are connected to have two degrees of electrical stability. These tubes are unstable when both are drawing current, but stable when one tube is passing current and the other blocking. The change from one position of stable equilibrium, such as when tube 23 is blocking and tube 24 is passing, to the other condition when tube 23 is passing and tube 24 blocking, is caused by the presence of a suitable predetermined potential on the leads 21 and 22. This locking circuit is more adequately described in United States Patent 1,844,950, granted February 16, 1932, to which reference is made for a more detailed explanation of the operation thereof.

Coupled to the output terminals of locking circuit 20 is a utilization circuit 25 which may be any desired device such as a relay, an ink recorder, printer or local tone oscillator. This utilization circuit responds to the changes of polarity occurring in the output of locking circuit 20 for marking and spacing conditions caused by the unbalance of the locking circuit under its two degrees of stability.

The operation of the circuit is as follows:

Due to the unbalance of the Wheatstone bridge circuit 5, as hereinabove outlined, any momentary assignment of the receiver to the grid of tube 18 of channel 1, as the distributor functions, will engender a pulse in resistance R′ of such polarity as will make the grid of tube 18 more positive, in turn causing more current to flow in its anode circuit, in consequence of which there is momentarily produced a predetermined potential on the upper lead 21 connecting with the locking circuit 20. Upon the flow of signal current through rectifier 3, however, which is in parallel relation with the fourth arm of the bridge, the resistance of branch 2R in the Wheatstone bridge circuit will be lowered to a value below that of the resistance in any of the other branches of the bridge, and for this reason a pulse of different polarity, of such nature as will momentarily make the grid of tube 18 negative and cause the tube to tend to block, will be engendered in resistance R′ upon the closure of the kicker assigning the transmission circuit to channel 1 during this signal current flow. Tube 19, on the other hand, which is normally arranged to pass about the same current as is normally passed by tube 18, will upon the application of a positive pulse to the grid of tube 18, which pulse causes this tube to pass a negative pulse to lead 21, simultaneously apply to lead 22 a momentary positive pulse by virtue of the push-pull relationship of the tubes. Similarly for the condition of signal flow, the negative pulse to the grid of tube 18, which causes this tube to apply a positive pulse to lead 21, will by virtue of the above mentioned push-pull action in tube 19 apply a momentary negative pulse to lead 22. In this manner both tubes function in push-pull relationship to apply pulses of predetermined polarity to leads 21 and 22.

Figure 2 illustrates another embodiment wherein the locking circuit 20 is connected directly to the distributor or commutator arrangement over a single lead 26 without the intervention of the coupling tube arrangement. In this circuit, changes of polarity in the pulses assigned to the locking circuit due to the unbalanced conditions of the Wheatstone bridge circuit 5, which, in turn, are dependent upon whether current flows through rectifier 3, affect the bias of the tubes in the locking circuit to change the degree of electrical stability therein. In connection with this figure, it will be noted that the use of resistances R′ are dispensed with. The operation of the circuit will be obvious from what has been set forth before in connection with Figure 1.

The preferred embodiment is illustrated in Figure 3 which is similar in arrangement to the circuit of Figure 2 except for the addition of an electron discharge device coupling tube 27 which functions to prevent the rectifier from drawing excessive current due to a possible feed-back of voltage from the Wheatstone bridge to the rectifier. Any feed-back from the Wheatstone bridge 5, it has been found, causes the application of a positive potential to the rectifier and enables the latter to draw a certain amount of current continuously, independent of the incoming signal, a condition which is undesirable since it produces a finite shunt resistance across the unbalanced arm 2R of the bridge. Coupling tube 27 serves in this arrangement to isolate the rectifier from the grid circuit 6 thus obviating the shunt resistance effect mentioned above.

In Figure 3, the electron discharge coupling device 27 has its grid biased by battery 8 so as to normally pass current when signal is not being received from the rectifier. The rectified signal is arranged to impress a negative potential on the grid, thus causing tube 27 to block or cut off. In this condition the values of the resistances in the arms of the grid will be approximately as indicated in the drawings. Due to this unbalance a current will flow across the grid which, upon connection through the kicker to the locking circuit, will cause a flow of current through resistance 28 causing lead 29 to have a more positive potential than lead 30 for the period during which the kicker is closed. When tube 27 draws current, however, a condition which exists when no signal is being received, the tube will act as a resistance across arm 2R and will, in effect, decrease the value of the resistance across this arm to something less than R. If the kicker should be closed at this time, current will now flow through resistance 28 in the opposite direction, causing lead 30 to have a more positive potential than lead 29. These changes of potential across leads 29 and 30 are passed on to the grids of the locking circuit device, as described above.

I claim:

1. In a communication system, the combination with a Wheatstone bridge having four branches, of an input circuit conductively connected in parallel with one of said branches, said input circuit beng arranged when functioning to change the effective impedance of said one branch, and an output circuit adapted to be connected effectively to a diagonal of said bridge.

2. A combination in accordance with claim 1 characterized in this, that said Wheatstone bridge is normally unbalanced, said one branch having an impedance value which is different from said other three branches.

3. In a communication system, the combination with a Wheatstone bridge comprising three branches having equal impedances and a fourth branch having a different impedance, of an input circuit conductively connected in parallel relationship with said last impedance, said input circuit being arranged when functioning to change the effective impedance of said fourth branch, and an output circuit adapted to be connected effectively to a diagonal of said bridge.

4. In a communication system, the combination with a Wheatstone bridge comprising three branches having equal impedances and a fourth branch having an impedance greater than any one of said other branches, of an input circuit conductively connected in parallel relationship with said impedance, said input circuit being arranged when functioning to change the effective impedance of said fourth branch to a value less than any of said other three branches, and an output circuit adapted to be connected effectively to a diagonal of said bridge.

5. In a communication system, the combination with a Wheatstone bridge comprising three branches having equal value resistances and a fourth branch having a resistance greater in value than the other resistances, of a signal input circuit comprising a rectifier in parallel relationship with said fourth branch, said rectifier being arranged when passing current to change the effective impedance of said fourth branch to a value less than that of any of the other branches, and an output circuit adapted to be connected effectively to a diagonal of said bridge.

6. In a communication system, the combination with a Wheatstone bridge having four branches, of a signal input circuit conductively connected in parallel relationship with one of said branches, a source of potential connected to one diagonal of said bridge and an output circuit connected across another diagonal of said bridge.

7. In a multiplex telegraph system, the combination with a Wheatstone bridge having four branches, of a signal input circuit in parallel with one of said branches, a source of potential connected across one diagonal of said bridge, and an output circuit connected across another diagonal of said bridge, said output circuit comprising a distributor for connecting at predetermined intervals the various channels of said multiplex system to said bridge.

8. In combination, a first electron discharge device having a cathode, anode and control electrode, an input circuit adapted to be connected to said control electrode and said cathode, a second electron discharge device having a cathode, an anode and a control electrode, the cathodes of said two devices being effectively connected together, a connection including an impedance between the anodes of said two devices, connections from separated points on said impedance to an output circuit, a source of positive potential connected to said impedance intermediate said points, a second impedance, a connection from one terminal of said second impedance to the anode of said first device, and a connection from the other terminal of said second impedance to a source of negative potential, and a conductive path from the control electrode of said second device to a point intermediate the terminals of said second impedance whereby there is obtained a push-pull effect in said output circuit upon the flow of pulses of suitable polarity in said input circuit.

9. A combination in accordance with claim 8 characterized in this, that said points of said first impedance are the terminals of said impedance.

10. In combination, a first electron discharge device having a cathode, anode and control electrode, an input circuit adapted to be connected to said control electrode and said cathode, said input circuit comprising an unbalanced Wheatstone bridge having four branches and a signal receiving circuit in parallel relationship with one of said branches, a second electron discharge device having a cathode, anode and control electrode, the cathodes of said first and second device being effectively connected together, a connection including an impedance between the anodes of said two devices, connections from separated points of said impedance to an output circuit, said output circuit comprising a pair of electron discharge devices having their anodes and control electrodes resistively inter-connected whereby when there is a predetermined maximum anode current in one of said devices there is a predetermined minimum current in the anode circuit of the other of said devices, said connections from the terminals of said impedance aiding to establish a reverse set of anode currents in said pair of devices, a source of positive potential connected to said impedance intermediate said points, a second impedance, a connection from one terminal of said second impedance to the anode of said first device, a connection from the other terminal of said impedance to a source of negative potential, and a conductive path from the control electrode of said second device to a point intermediate the terminals of said second impedance whereby there is obtained a push-pull effect in said output circuit upon the flow of pulses in said input circuit.

11. In a communication system, the combination with a Wheatstone bridge comprising three branches having equal impedances and a fourth branch having an impedance greater than any one of said other branches, of an input circuit in parallel relationship with said fourth branch, said input circuit being arranged when functioning to change the effective impedance of said fourth branch to a value less than any of said other three branches, and an output circuit adapted to be connected effectively to a diagonal of said bridge, said output circuit comprising a pair of electron discharge devices having their anodes and control electrodes resistively interconnected whereby when there is a predetermined maximum anode current in one of said devices there is a predetermined minimum current in the anode circuit of the other of said devices.

12. In a communication system, the combination with a Wheatstone bridge comprising three branches having equal impedances and a fourth branch having an impedance greater than any one of said other branches, of an input circuit in parallel relationship with said fourth branch, said input circuit being arranged when functioning to change the effective impedance of said fourth branch to a value less than any of said other three branches, and an output circuit comprising a pair of electron discharge devices having their anodes and control electrodes resistively interconnected whereby when there is a predetermined maximum anode current in one of said devices there is a predetermined minimum current in the anode circuit of the other of said devices, and a distributor in circuit with said output circuit arranged to connect said output circuit at predetermined intervals to a diagonal of said bridge.

13. In a multiplex telegraph system, the combination with a Wheatstone bridge comprising three branches having equal value resistances and a fourth branch having a resistance greater than any of the said other branches, of a signal input circuit connected in parallel with said fourth branch, a source of potential connected across one diagonal of said bridge and an output circuit connected across another diagonal of said bridge, said output circuit comprising a distributor connecting at predetermined intervals the various channels of said multiplex system to said bridge.

RICHARD E. MATHES.